H. C. HARRISON.
DIMMER FOR AUTOMOBILE HEADLIGHTS.
APPLICATION FILED DEC. 22, 1913.
1,136,006.
Patented Apr. 20, 1915.
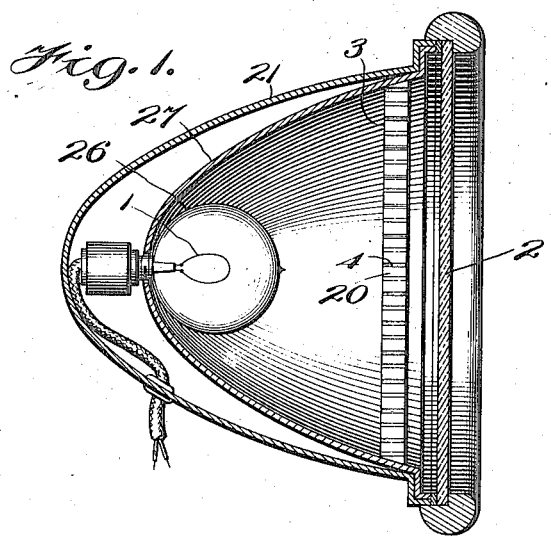
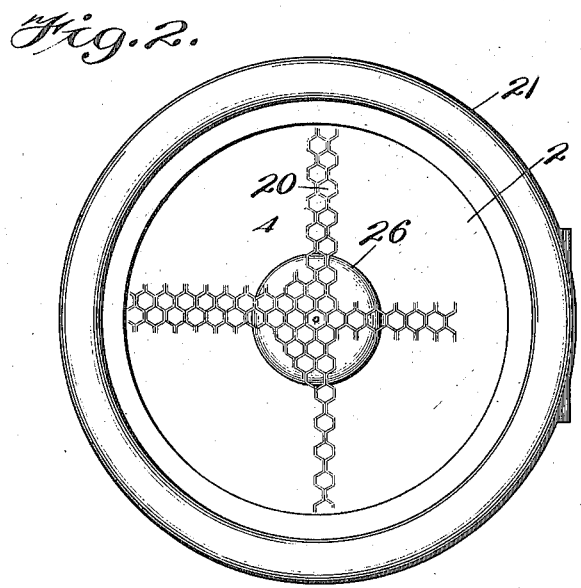
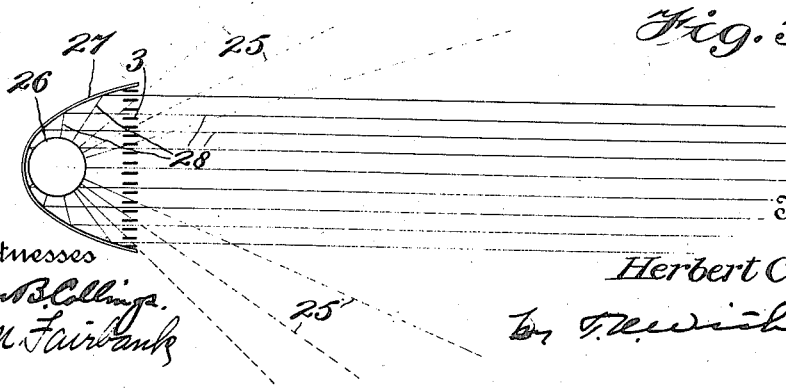

UNITED STATES PATENT OFFICE.

HERBERT CHAMPION HARRISON, OF LOCKPORT, NEW YORK.

DIMMER FOR AUTOMOBILE-HEADLIGHTS.

1,136,006.     Specification of Letters Patent.     Patented Apr. 20, 1915.

Application filed December 22, 1913. Serial No. 808,257.

*To all whom it may concern:*

Be it known that I, HERBERT CHAMPION HARRISON, a subject of the King of Great Britain, residing at Lockport, in the county of Niagara and State of New York, have invented certain new and useful Improvements in Dimmers for Automobile-Headlights; and I do hereby declare the following to be a full, clear, and exact description of the invention, such as will enable others skilled in the art to which it appertains to make and use the same.

This invention relates to a means whereby the glare from an automobile head light is regulated, or rendered less bright, and has for its object to provide an apparatus that while casting a beam upon the road ahead of the car, will yet not cast a glare into the eyes of a driver on an approaching car, all as will be clear from what follows.

With these objects in view, the invention consists in the novel details of construction, and combinations of parts more fully hereinafter disclosed and particularly pointed out in the claims.

Referring to the accompanying drawings forming a part of this specification, in which like numerals designate like parts in all the views: Figure 1 is a diagrammatic sectional view of a head light provided with my invention; Fig. 2 is a front elevational view of the parts shown in Fig. 1, a portion of the grid being omitted; and, Fig. 3, is a diagrammatic view illustrating the principles involved in my invention.

1 indicates any suitable source of light; 2, a glass or lens associated with the usual head lights employed on automobiles or other vehicles; and 3, a grid or screen consisting of a number of cells 20 of relatively small diameter compared with their depth and placed between the source of light 1 and the glass or lens 2. I have found by trial that the depth of the cells need not be great if their diameter is say one-fourth of an inch, or less, so that there is ample room in an ordinary automobile head light 21 between the glass 2 and the source of light 1 to accommodate the grid 3. I have found, for example, with a cell having a diameter of say three-sixteenths of an inch, that a depth of the grid of one-half an inch to three-quarters of an inch may be employed which will serve to cut off a great deal of the glaring or confusing light from the eyes of the driver of an approaching car when the cars are say forty or fifty yards apart. This grid or screen may be made from cells of any desired shape, but I prefer cells having the hexagonal walls 4 illustrated in the drawings on account of the convenience of their manufacture, and further, on account of their efficiency in cutting off that portion of the light which constitutes the glare in approaching automobiles.

The precise operation of my invention has not been as yet determined with certainty, but I believe it to be somewhat as follows, especial reference being had to the diagram illustrated in Fig. 3: Those rays of light such as 25, which leave the globe 26 without being reflected from the parabolic reflector 27, and which therefore do not proceed from said reflector in parallel rays, will be intercepted by the walls 4 of the grid 3, as indicated in Fig. 3, while those rays of light 28 which are reflected from the parabolic reflector 27 and which therefore proceed in parallel paths are permitted to pass through said grid. If the member 2 is a convex lens said rays 28 will be more or less converged to a focus, while if said member 2 is a plain glass they will constitute a pencil of parallel rays, but in either case the rays 25 which constitute the glare and cause the confusion on an approaching car are cut off, so that the danger of collision is very greatly avoided. In all cases, of course, there are still some stray rays which do not strictly belong to the pencil 28, but these are not found objectionable, and in fact probably aid in locating the car carrying my grid when the approaching driver is out of the parallel pencil 28.

It is obvious that those skilled in the art may vary the details of construction, as well as the arrangement of parts without departing from the spirit of my invention, and therefore I do not wish to be limited to the above disclosure except as may be required by the claims.

What I claim is:—

1. In a vehicle light the combination of a source of light, a transparent member associated with said source of light; and a screen located between said transparent member and said source of light comprising a plurality of polygonal cells with parallel walls forming direct passages for light between said source and said transparent member, substantially as described.

2. In a vehicle head light the combination of a lamp; an inclosure for said lamp comprising a transparent member; and a screen located between said lamp and a transparent member composed of polygonal cells whose depths are greater than their diameters, substantially as described.

In testimony whereof I affix my signature, in presence of two witnesses.

HERBERT CHAMPION HARRISON.

Witnesses:
MARGARET WHALEN,
HARRIET HUSTON.